3,558,551
NUCLEATION OF 1-OLEFIN POLYMERS WITH
PHTHALOCYANINE PIGMENTS
Dixie E. Gilbert, Bartlesville, and Tommy G. Poff, Cushing, Okla., assignors to Phillips Petroleum Company, a corporation of Delaware
No Drawing. Filed Mar. 18, 1968, Ser. No. 714,074
Int. Cl. C08f 45/14
U.S. Cl. 260—41         9 Claims

ABSTRACT OF THE DISCLOSURE

The crystal structure of 1-olefin polymers is altered by the addition of between 0.0005 an 0.005 weight percent of a phthalocyanine pigment.

BACKGROUND OF THE INVENTION

This invention relates to the nucleation of polymers of at least one 1-olefin, said 1-olefin having 2 to 8 carbon atoms per molecule, with very small amounts of phthalocyanine pigments.

Frequently it has been found desirable to modify the crystalline structure of the various olefin polymers. In particular, with such relatively new members of this class of polymers as high density polyethylene and polypropylene it has been found possible to greatly alter the physical properties by adding various materials to the polymer to nucleate the formation of crystals. This is because, in many of these polymers, large crystal structures known as spherulites form on cooling the polymers to a point below their crystalline freezing point. The addition of nucleating agents results in the formation of a crystal structure which is substantially free of large spherulites. This results in a polymer with physical properties which are better suited for certain applications. For instance, it results in the polymer having greater transparency which is desirable in many film applications. Also, it may result in a polymer of increased flexural modulus or stiffness which may make possible the fabrication of parts of thinner cross section, having rigidity comparable to those made from thicker sections of polymer not containing a nucleating agent, although it is sometimes the case that excessive nucleation occurs giving a product which is brittle.

Several materials have been disclosed in the prior art as being of varying degrees of value and nucleating agents for certain polymers. While some effort has been made to characterize the type of agents which are effective—see for instance the Journal of Polymer Science, vol. 39, page 544, (1959)—for the most part the reason some materials are effective and others are ineffective has gone unexplained.

SUMMARY OF THE INVENTION

It is an object of this invention to provide 1-olefin polymers with improved optical properties. It is a further object of this invention to provide 1-olefin polymers with improved optical properties without adversely affecting the toughness of the polymer. It is yet a further object of this invention to provide 1-olefin polymer compositions suitable for fabricating into products of improved optical properties.

It has been found that the addition of between 0.0005 and 0.005 weight percent of a phthalocyanine pigment in 1-olefin polymers results in an improvement in optical properties without adversely affecting other physical properties such as impact resistance.

DESCRIPTION OF THE PREFERRED EMBODIMENTS

By phthalocyanine pigment it is meant any of the compounds containing a tetrabenzoporphyrazine nucleus (four benzopyrrole nuclei joined by four N-atoms) either metal free or containing copper or some other metal. A typical structure for such pigments is shown below:

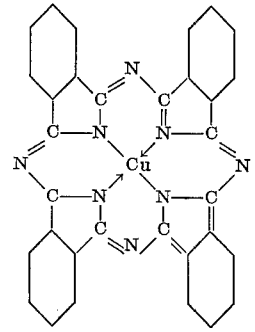

These materials are commercially available under the designation phthalocyanine green and phthalocyanine blue.

Applicable 1-olefin polymers for use in the practice of this invention include polymers of 1-olefins having from 2 to 8 carbon atoms per molecule preferably homopolymers and copolymers of ethylene, propylene, and butene, more preferably polypropylene. These polymers can be produced by any of the methods well known in the art. A particularly suitable polymerization method for preparing olefin polymers and copolymers for use in the instant invention is that described in U.S. 2,825,721 to Hogan et al. Another suitable method for preparing olefin polymers and copolymers for use in the instant invention is that utilizing the well-known organometal catalyst systems comprising a transition metal compound such as a titanium halide and a reducing compound such as aluminum alkyl.

The phthalocyanine pigments can be incorporated into the polymers by any known manner such as by melt blending, dry blending, or solution blending. The concentration of the phthalocyanine pigment must be very low, between 0.0005 and 0.005, preferably between 0.0005 and 0.004 weight percent based on the weight of the polymer, most preferably about 0.001 weight percent. Mixtures of the various phthalocyanine pigments can be used so long as the total concentration of all the phthalocyanine pigments does not exceed 0.005 weight percent.

In order to effect the modification of crystal structure, the polymer must be crystallized from the melt phase. If melt blending is used, then the modified crystal structure will result on the initial cooling. If a technique such as dry blending is used, the polymer must be blended and then recrystallized; this is of no disadvantage however since polymer will generally be melted during the fabrication step. Of course the polymer can be melted and recrystallized a number of times if desired.

The polymer can contain other additives such as antioxidants, u.v. stabilizers, and the like.

Example I

Pure copper-free phthalocyanine from K and K Laboratories Inc., Catalogue number 16700 was added to 3.5 melt flow (ASTM D 1238–62T, Condition L), 0.91 density (ASTM D 1505–63T) polypropylene and tumble mixed. Two mixtures were prepared, one containing 0.001 weight percent pigment and the other 0.005 weight percent. Each mixture was then extruded and the melt run through a set of rolls to make a sheet. A similar sheet was made from the base resin. The final sheet was about 5 mils thick in each case. These sheets were held about 6 inches from a viewer's eye, and the viewer observed letters approximately ⅛″ high on an eye chart. The maximum distance between the eye chart and the film from which the letters could be read was recorded as the see-through value. The results were as follows:

TABLE I

|  | Weight percent pigment | See-through, inches |
|---|---|---|
| Control | 0 | 1 |
|  | 0.001 | 10 |
|  | 0.005 | [1] ca. 10 |

[1] Considerable color imparted by the pigment.

These data reveal that the presence of a very small amount of phthalocyanine pigment greatly improves the optical properties of the polymer.

This particular phthalocyanine was copper-free. Similar results were obtained using copper-containing phthalocyanine blue and phthalocyanine green.

Example II

The polymer compositions of Example I were fabricated into 15-ounce bottles by blow molding. These bottles were filled liquid full with water and dropped from a height of 10 feet with the number of drops required to break a particular bottle being recorded. The results are shown in the following table.

TABLE II

| Weight percent pigment: | Number of drops to failure |
|---|---|
| 0 | 5 |
| 0.001 | 5 |
| 0.005 | 2 |

These data reveal that very small amounts of the phthalocyanine pigment, which are effective to improve the optical properties, have no harmful effect on the physical properties as indicated by the bottle drop test. However at a concentration of 0.005 the polymer begins to show signs of being brittle as indicated by reduced resistance to failure in the bottle drop test.

It is highly surprising that such a low concentration of phthalocyanine pigment is effective in improving the optical properties. Generally in the prior art, nucleating agents have been employed in amounts ranging between at least 0.01 and 1 weight percent. Thus the minimum concentration of the nucleating agent as recognized by the prior art is twice the maximum amount utilized in the instant invention. It is even more remarkable that this small amount improves the optical properties without a concomitant embrittlement which would show up in reduced resistance to the bottle drop test.

While this invention has been described in detail for the purpose of illustration it is not to be construed as limited thereby but is intended to cover all changes and modifications within the spirit and scope thereof.

We claim:

1. A composition comprising:
    a polymer of at least one 1-olefin, said 1-olefin having from 2 to 8 carbon atoms per molecule; and
    from 0.005 to 0.004 weight percent, based on the weight of said polymer, of at least one phthalocyanine pigment.

2. A composition according to claim 1 wherein said polymer is a polymer of a 1-olefin selected from the group consisting of ethylene, propylene, butene, and mixtures thereof.

3. A method of modifying the crystal structure of polymers of at least one 1-olefin, said 1-olefin having from 2 to 8 carbon atoms per molecule, comprising:
    producing a melt of said polymer admixed with between 0.0005 and 0.004 weight percent, based on the weight of said polymer, of at least one phthalocyanine pigment; and
    crystallizing the resulting mixture from said melt.

4. A method according to claim 3 wherein said polymer is a polymer of a 1-olefin selected from the group consisting of ethylene, propylene, butene, and mixtures thereof.

5. A method according to claim 4 wherein said polymer is polypropylene and said phthalocyanine pigment is selected from the group consisting of phthalocyanine blue and phthalocyanine green.

6. A method according to claim 5 wherein said phthalocyanine pigment is present in a concentration of about 0.001 weight percent, based on the weight of said polymer.

7. A composition according to claim 2 wherein said polymer is polypropylene and said phthalocyanine pigment is selected from the group consisting of phthalocyanine blue and phthalocyanine green.

8. A composition according to claim 7 wherein said polymer has a 3.5 melt flow.

9. A method according to claim 5 wherein said polymer has a 3.5 melt flow.

References Cited

UNITED STATES PATENTS

| 3,247,159 | 4/1966 | Pendleton et al. | 260—41 |
| 3,232,891 | 2/1966 | Bata | 260—41X |
| 3,408,322 | 10/1968 | Mills | 260—41 |

MORRIS LIEBMAN, Primary Examiner

T. MORRIS, Assistant Examiner

UNITED STATES PATENT OFFICE

CERTIFICATE OF CORRECTION

Patent No. 3,558,551　　　　Dixie E. Gilbert et al　　Dated: January 26, 197

It is certified that error appears in the above-identified patent and that s Letters Patent are hereby corrected as shown below:

Column 4, line 15, "0.005" should be --- 0.0005 ---.

Signed and sealed this 2nd day of November 1971.

(SEAL)
Attest:

EDWARD M. FLETCHER, JR.　　　　　　　ROBERT GOTTSCHALK
Attesting Officer　　　　　　　　　　　Acting Commissioner of Patent